(12) United States Patent
Alber

(10) Patent No.: US 12,365,055 B2
(45) Date of Patent: Jul. 22, 2025

(54) METHOD FOR TRANSPORTING FLAT MATERIALS TO BE WELDED IN THE PRODUCTION OF A WELDED BEAM AND DEVICE FOR SAME

(71) Applicant: BAOSTEEL LASERTECHNIK GMBH, Ravensburg (DE)

(72) Inventor: Gerhard Alber, Berg (DE)

(73) Assignee: Baosteel Lasertechnik GmbH, Ravensburg (DE)

( * ) Notice: Subject to any disclaimer, the term of this patent is extended or adjusted under 35 U.S.C. 154(b) by 823 days.

(21) Appl. No.: 17/635,889

(22) PCT Filed: Aug. 10, 2020

(86) PCT No.: PCT/EP2020/072412
§ 371 (c)(1),
(2) Date: Feb. 16, 2022

(87) PCT Pub. No.: WO2021/032522
PCT Pub. Date: Feb. 25, 2021

(65) Prior Publication Data
US 2022/0305595 A1    Sep. 29, 2022

(30) Foreign Application Priority Data
Aug. 20, 2019  (DE) .......................... 102019122308.3

(51) Int. Cl.
*B23K 37/047* (2006.01)
*B23K 31/12* (2006.01)
*B23K 101/28* (2006.01)

(52) U.S. Cl.
CPC ............ *B23K 37/047* (2013.01); *B23K 31/12* (2013.01); *B23K 2101/28* (2018.08)

(58) Field of Classification Search
CPC ... B23K 37/047; B23K 31/12; B23K 2101/28
(Continued)

(56) References Cited

FOREIGN PATENT DOCUMENTS

DE        884725 C      7/1953
DE       1963518 U      7/1967
(Continued)

OTHER PUBLICATIONS

YouTube Video Https://www.youtube.com/watch?=7fjcGS1Ahag—"Nuova CMM Beams Welding Line TBL" by Nuova C.M.M published on Feb. 17, 2016 (Year: 2016).*
(Continued)

*Primary Examiner* — Eric S Stapleton
*Assistant Examiner* — Yeong Juen Thong
(74) *Attorney, Agent, or Firm* — Christopher J. Volkmann; KELLY, HOLT & CHRISTENSON, P.L.L.C.

(57) ABSTRACT

A method is provided for transporting flat materials to be welded together, specifically a first flange and/or a second flange and a web for producing a beam through a welding station. The flat materials are aligned and guided by rollers. A slide is arranged upstream of the welding station in the run-through direction and a gripper is arranged downstream of the welding station. The slide introduces the flat materials into the welding station and moves them as far as a first position by means of a pushing movement at an advancement speed. The gripper grips the flat materials at the first position, and pulls the flat materials out of the welding station at the pulling speed and moves them as far as a second position by means of a pulling movement. The slide is arranged upstream of the welding station and the gripper is arranged downstream of the welding station.

14 Claims, 2 Drawing Sheets

(58) Field of Classification Search
USPC ............... 219/121.6, 121.64, 121.61, 121.63
See application file for complete search history.

(56) References Cited

FOREIGN PATENT DOCUMENTS

| | | |
|---|---|---|
| DE | 19511098 C1 | 4/1996 |
| EP | 0438615 A1 | 7/1991 |
| WO | WO 2010111794 A1 | 10/2010 |
| WO | WO 2019058402 A1 | 3/2019 |

OTHER PUBLICATIONS

YouTube Video https://www.youtube.com/watch?v=VJoOXk-JHgQ "Beam line system with sub-axis spindles for automatic steel fabrication, valiant" by Ficep Corporation published on Mar. 7, 2019 (Year: 2019).*

"T and I-Beam manufacturing line", YouTube, Mar. 14, 2013, Retrieved from the Internet: <<https://www.youtube.com/watch?v=PTdnAzzDrxY>>, Retrieved on Nov. 5, 2020, 2 pages.

International Search Report and Written Opinion for International Patent Application No. PCT/EP2020/072412, date of mailing: Nov. 19, 2020, 13 pages with English Translation of Search Report.

Office Action for German Patent Application No. 102019122308.3 dated Jul. 14, 2020, 8 pages.

International Preliminary Report on Patentability for International Patent Application No. PCT/EP2020/072412, Date of Issuance of Report: Feb. 17, 2022, 8 pages.

\* cited by examiner

METHOD FOR TRANSPORTING FLAT MATERIALS TO BE WELDED IN THE PRODUCTION OF A WELDED BEAM AND DEVICE FOR SAME

CROSS-REFERENCES TO RELATED APPLICATIONS

This application is a Section 371 National Stage Application of International Application No. PCT/EP2020/072412, filed Aug. 10, 2020, and published as WO 2021/032522 A1 on Feb. 25, 2021, and claims priority to German Application No. 102019122308.3, filed Aug. 20, 2019, the contents of both are hereby incorporated by reference in their entirety.

DETAILED DESCRIPTION

The present disclosure relates to a method for producing a welded T-beam profile, in particular an I-beam or an L-beam or a T-beam or V-beam.

Methods for producing welded T-beams are known from the prior art. In this context, the beams are usually produced individually in installations by a run-through process. Continuous production is not enabled here.

An object of the present disclosure is therefore to improve known methods for producing a T-beam or an I-beam, in particular to make them more effective. This object is achieved by the method according to one embodiment of the invention. Advantageous refinements and expedient configurations are specified in the dependent claims.

One embodiment of invention provides a method for transporting flat materials to be welded together, specifically a first flange and/or a second flange and a web for producing a beam, in particular an L-beam or T-beam or V-beam or I-beam, through a welding station, wherein the flat materials are aligned and guided by rollers. In this context, it is provided that a slide is arranged upstream of the welding station in the run-through direction and a gripper is arranged downstream of the welding station in the run-through direction, and the slide introduces the flat materials into the welding station and moves them as far as a first position by means of a pushing movement at an advancement speed suitable for the welding process, and the gripper grips the flat materials at the first position and the gripper pulls the flat materials out of the welding station at the pulling speed suitable for the welding process and moves them as far as a second position by means of a pulling movement.

The combined push-pull transport makes it possible to perform continuous movements, as shown below by the detailed description on the basis of an exemplary embodiment.

One embodiment of invention likewise provides the corresponding use of the method described also for producing a simple T-beam or L-beam or V-beam.

The welding operation is implemented in the present case as through-welding and is possible by virtue of the considerably extended longitudinal extent with respect to the welding position. However, the type of welding operation is irrelevant for the present disclosure, which means that also fillet welding or other processes can be used correspondingly.

The further features of embodiments of the invention are to be explained in more detail with reference to the exemplary embodiment presented below. However, in this respect the invention is not limited to the embodiment presented.

Figure 1:
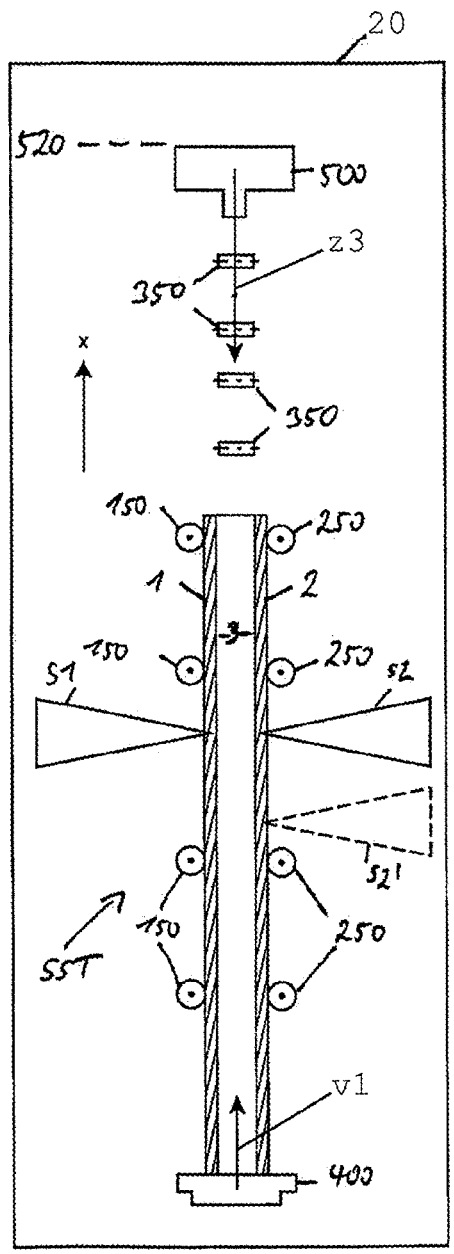
FIG. 1 shows a schematic snapshot during transport for the purpose of carrying out the method according to one example.

In this respect, FIG. 1 shows a snapshot of a method for transporting the flat materials to be welded together, specifically a first flange 1 and a second flange 2 and a web 3 for producing an I-beam, through a welding station SST, the flat materials being aligned and guided by rollers 150, 250, 350. The slide 400 is arranged upstream of the welding station SST in the run-through direction and the gripper 500 is arranged downstream of the welding station (SST) in the run-through direction.

In FIG. 1, the slide 400 introduces the flat materials into the welding station SST as far as a first position 410 by means of a pushing movement and in doing so moves at an advancement speed v1 suitable for the welding process.

Consequently, the slide 400 is provided to at least for some time transport or move the first flange 1 and move the second flange 2 and move the web 3, wherein the slide 400 is arranged upstream of the welding station SST in the run-through direction, lies against the first flange 1 and the second flange 2 and the web 3 and performs the movement as an advancing movement in the longitudinal direction or advancement direction x. The slide 400 moves the components 1, 2 and 3 by continuous advancement through the welding station SST, depending on the advancement speed required by the welding operations S1 and S2.

In this respect, the slide may also have a multi-part form, in particular comprise multiple slide elements, so that if appropriate one slide element moves the first flange, one slide element moves the second flange and one slide element moves the web.

Figure 2:
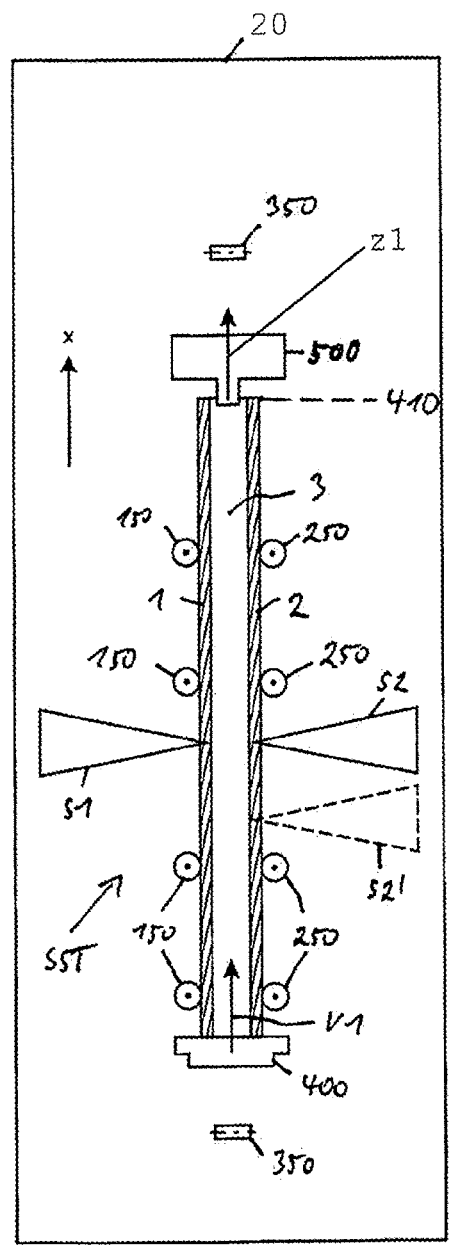
FIG. 2 shows a further schematic snapshot during transport for the purpose of carrying out the method according to one example.
Figure 3:
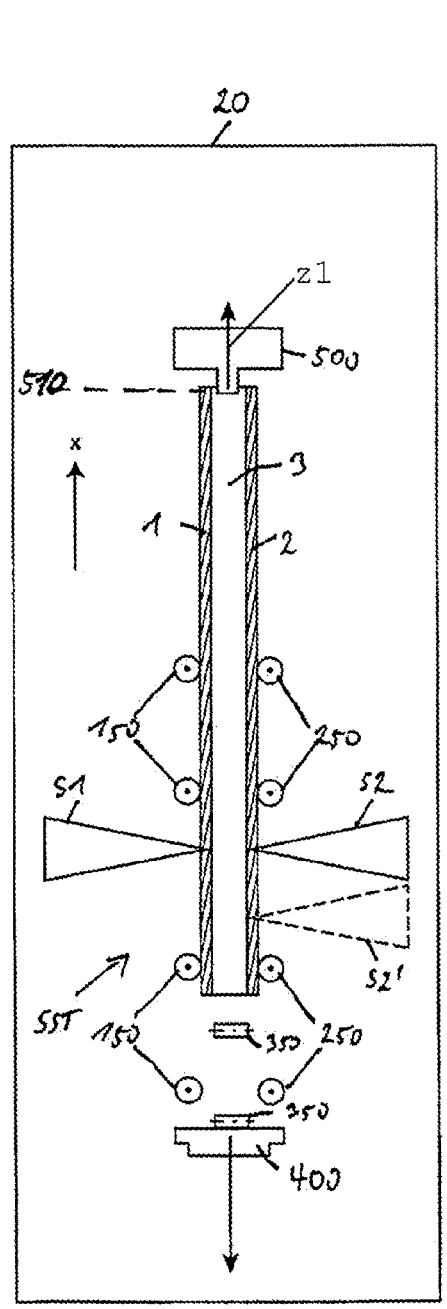
FIG. 3 shows a further schematic snapshot during transport for the purpose of carrying out the method according to one example.

In FIG. 2, the gripper 500 takes up the flat materials at the first position 410 and grips them and pulls the flat materials further through the welding station SST at the pulling speed z1 suitable for the welding process as far as a second position 510, illustrated in FIG. 3, by means of a pulling movement.

As soon as the beam to be produced has been pushed far enough through the welding station SST, the first flange 1 and the second flange 2 and the web 3 are moved at least for some time by a gripper 500. The gripper 500 is arranged downstream of the welding station SST in the run-through direction, grips the first flange 1 and/or the second flange 2 and/or the web 3 and performs the movement as a pulling movement in the longitudinal direction or advancement direction x.

In this respect, the gripper 500 may also have a multi-part form, in particular comprise multiple gripping elements, so that if appropriate one gripping element moves the first flange, one gripping element moves the second flange and one gripping element moves the web.

The transfer of the beam to be produced from the slide 400 to the gripper 500 causes a switch to be made from a pushing movement to a pulling movement, and the slide 400 can move separately if appropriate.

For this purpose, there is at least one point in time at which both the slide 400 and the gripper 500 lie against or grip, respectively, the first flange and/or the second flange and/or the web at the same time and in particular perform a synchronized, homogeneous movement.

In this respect it is provided that, after the flat materials have been transferred to the gripper 500 in the first position 410, the slide 400 returns, counter to the advancement direction x, to a standby position 420, as illustrated in FIG. 3. At the standby position 420 illustrated in FIG. 4, the slide takes up a further set of flat materials, in particular a first flange 1a and a second flange 2a and a web 3a for producing a further I-beam, for readvancement into the welding station SST.

Figure 4:
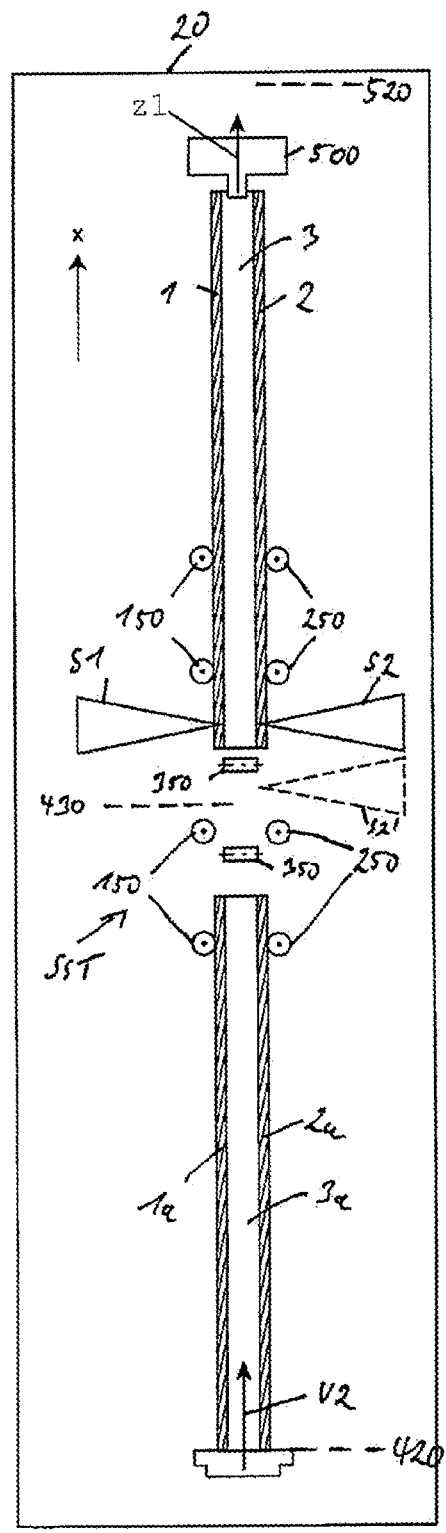
FIG. 4 shows a schematic snapshot during transport for the purpose of carrying out the method according to one example with two I-beams during continuous operation.

In order to achieve continuous production of the beam, such as in particular I-beams or T-beams or L-beams or V-beams, as illustrated in FIG. 4 the slide 400, after the provision of the further set of flat materials, advances them at a speed v2 that is faster than the advancement speed v1 as far as the welding station SST, and reduces its speed to the advancement speed v1, which is matched to the welding process, when an entry position 430 of the flat materials into the welding station SST is reached. In this way, the offset between the beams to be produced in the welding station SST is minimized and may be brought almost to zero, depending on the desired control of the speeds.

In a manner corresponding to this alternating push-pull movement, the gripper 500 will dispense the welded-together flat materials at an end position 520 illustrated in FIG. 4 and move back to the first position 410 counter to the advancement direction x at a speed z3 that is faster than the pulling speed z1 (see also FIG. 1), in order to take up a further set of flat materials in a gripping manner.

In this way, the sequence corresponding to FIGS. 1, 2, 3 and 4 has the effect that the flat materials, in particular the first flange 1 and the second flange 2 and the web 3 for producing a beam, in particular an I-beam, are transported continuously through the welding station SST.

A T-beam, which is welded together only from one flange and a web, is transported in a similar way to an I-beam through a corresponding welding station, with only two flat materials being moved respectively by a slide or gripper.

Although the present invention has been described with reference to preferred embodiments, workers skilled in the art will recognize that changes may be made in form and detail without departing from the spirit and scope of the invention.

LIST OF REFERENCE SIGNS

1 First flange
2 Second flange
3 Web
1a First flange
2a Second flange
3a Web
150 Roller
250 Roller
350 Roller
400 Slide
410 First position
420 Standby position
430 Entry position
500 Gripper
510 Position
520 End position
S1, S2 Welding operation
SST Welding station
v1 Advancement speed
z1 Pulling speed
v2 Faster speed
z3 Faster speed
x Advancement direction, longitudinal direction

The invention claimed is:

1. A method for transporting flat materials to be welded together including one or more of a first flange, a second flange, or a web for producing a beam through a welding station having rollers that align and guide the flat materials, the method comprising:
introducing, by a slide arranged upstream of the welding station in a run-through direction, the flat materials into the welding station;
moving, by the slide, the flat materials as far as a first position by a pushing movement on one end of the flat materials at an advancement speed suitable for a welding process;
gripping, by a gripper arranged downstream of the welding station in the run-through direction, the flat materials at the first position;
pulling, by the gripper, the flat materials out of the welding station at a pulling speed suitable for the welding process; and
moving, by the gripper, the flat materials, as far as a second position by a pulling movement on another end of the flat materials.

2. The method of claim 1, and further comprising:
after transferring the flat materials to the gripper in the first position, moving the slide back into a standby position counter to an advancement direction; and
providing, for advancement, a further set of flat materials, including another one or more of a first flange, a second flange, or a web for producing a further beam.

3. The method of claim 2, and further comprising:
after the provision of the further set of flat materials, advancing, by the slide, the further set of flat materials at a speed that is faster than the advancement speed as far as the welding station; and
reducing the speed of the further set of flat materials to the advancement speed when an entry position of the flat materials into the welding station is reached.

4. The method of claim 1, and further comprising:
dispensing, by the gripper, the flat materials at an end position after the flat materials are welded together;
moving the gripper to a position counter to an advancement direction at a speed that is faster than the pulling speed; and
gripping a further set of flat materials.

5. The method of claim 1, and further comprising:
continuously transporting the flat materials through the welding station.

6. The method of claim 1, wherein the beam comprises a L-beam.

7. The method of claim 1, wherein the beam comprises a T-beam.

8. The method of claim 1, wherein the beam comprises a V-beam.

9. The method of claim 1, wherein the beam comprises an I-beam.

10. An installation for producing an I-beam by means of welding together flat materials, including one or more of a first flange, a second flange, or a web, wherein the installation is configured to:
introduce, by a slide arranged upstream of a welding station in a run-through direction, the flat materials into the welding station, the welding station having rollers that align and guide the flat materials;

move, by the slide, the flat materials as far as a first position by a pushing movement on one end of the flat materials at an advancement speed suitable for a welding process;

grip, by a gripper arranged downstream of the welding station in the run-through direction, the flat materials at the first position;

pull, by the gripper, the flat materials out of the welding station at a pulling speed suitable for the welding process; and move, by the gripper, the flat materials, as far as a second position by a pulling movement on another end of the flat materials.

11. The installation of claim 10, wherein the installation is configured to:

after transfer of the flat materials to the gripper in the first position, move the slide back into a standby position counter to an advancement direction; and provide, for advancement, a further set of flat materials, including another one or more of a first flange, a second flange, or a web for producing a further I-beam.

12. The installation of claim 11, wherein the installation is configured to:

after the provision of the further set of flat materials, advance, by the slide, the further set of flat materials at a speed that is faster than the advancement speed as far as the welding station; and reduce the speed of the further set of flat materials to the advancement speed when an entry position of the flat materials into the welding station is reached.

13. The installation of claim 10, wherein the installation is configured to:

dispense, by the gripper, the flat materials at an end position after the flat materials are welded together;

move the gripper to a position counter to an advancement direction at a speed that is faster than the pulling speed; and grip a further set of flat materials.

14. The installation of claim 10, wherein the installation is configured to:

continuously transport the flat materials through the welding station.

* * * * *